(12) United States Patent
Jungbecker et al.

(10) Patent No.: US 8,607,920 B2
(45) Date of Patent: Dec. 17, 2013

(54) STEERING DEVICE, IN PARTICULAR FOR A REAR WHEEL STEERING SYSTEM

(75) Inventors: Johann Jungbecker, Badenheim (DE); Marco Besier, Bad Schwalbach (DE); Steffen Linkenbach, Eschborn (DE); Roland Dutoya, Toulouse (FR); Pierre-Philippe Thomy, Frankfurt am Main (FR); Frederice Laure, Tournefeuille (FR)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 13/133,014

(22) PCT Filed: Dec. 8, 2009

(86) PCT No.: PCT/EP2009/066628
§ 371 (c)(1),
(2), (4) Date: Aug. 15, 2011

(87) PCT Pub. No.: WO2010/066732
PCT Pub. Date: Jun. 17, 2010

(65) Prior Publication Data
US 2011/0284313 A1 Nov. 24, 2011

(30) Foreign Application Priority Data

Dec. 9, 2008 (DE) .......................... 10 2008 054 430
Aug. 27, 2009 (DE) .......................... 10 2009 039 164

(51) Int. Cl.
*B62D 5/04* (2006.01)
(52) U.S. Cl.
USPC ............................ 180/445; 180/412; 180/413

(58) Field of Classification Search
USPC ........ 180/445, 413, 412; 74/89.35; 280/5.521
See application file for complete search history.

(56) References Cited

U.S. PATENT DOCUMENTS 5,086,861 A     2/1992  Peterson
5,145,022 A *   9/1992  Kido ............................ 180/412
(Continued)

FOREIGN PATENT DOCUMENTS

DE  102007035004    2/2008
DE  102007007234    8/2008
EP    0340823      11/1989
EP    2077406       7/2009
(Continued)

OTHER PUBLICATIONS

International Search Report for PCT/EP2009/066628 filed Dec. 8, 2009, mailed Febraury 18, 2010.
(Continued)

*Primary Examiner* — Tony Winner
(74) *Attorney, Agent, or Firm* — RatnerPrestia

(57) ABSTRACT

A steering device for adjusting a wheel turning angle of a wheel of a motor vehicle, in particular of a rear wheel, includes a wheel guide member via which a wheel carrier of the wheel is connected to a vehicle body, the wheel carrier being swivellable about an axis of rotation disposed parallel to the wheel plane and the wheel guide member being articulated to the wheel carrier at a distance from the axis of rotation and being adjustable in length by an electromechanical drive unit, the electromechanical drive unit being connected, on the one hand, via a push rod to a joint at the wheel carrier end in order to form a swivel bearing to establish a connection to the wheel carrier, and, on the other hand, to a joint at the vehicle body end to form a further swivel bearing to establish a connection to the vehicle body.

14 Claims, 7 Drawing Sheets

(56) References Cited

U.S. PATENT DOCUMENTS

| | | | |
|---|---|---|---|
| 5,506,776 A * | 4/1996 | Fushimi et al. | 701/41 |
| 6,972,501 B2 * | 12/2005 | Morikawa et al. | 310/71 |
| 2007/0144833 A1 * | 6/2007 | Nii et al. | 184/7.1 |
| 2007/0205038 A1 * | 9/2007 | Tominaga et al. | 180/444 |
| 2007/0246289 A1 * | 10/2007 | Tominaga | 180/444 |
| 2008/0157490 A1 * | 7/2008 | Hakui et al. | 280/5.521 |
| 2008/0257081 A1 * | 10/2008 | Hakui et al. | 74/89.35 |
| 2010/0019465 A1 * | 1/2010 | Yuta et al. | 280/86.758 |

FOREIGN PATENT DOCUMENTS

| | | |
|---|---|---|
| EP | 2130744 | 12/2009 |
| WO | 2006117343 | 11/2006 |
| WO | 2008081665 | 7/2008 |
| WO | 2008114659 | 9/2008 |

OTHER PUBLICATIONS

German Search Report for DE 10 2009 039 164.9 dated May 3, 2010.

* cited by examiner

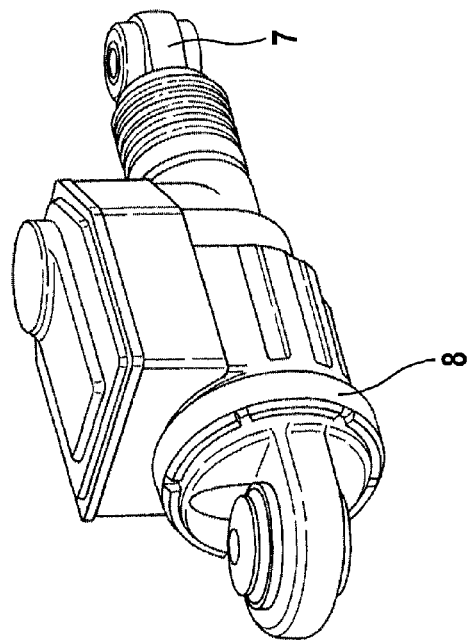
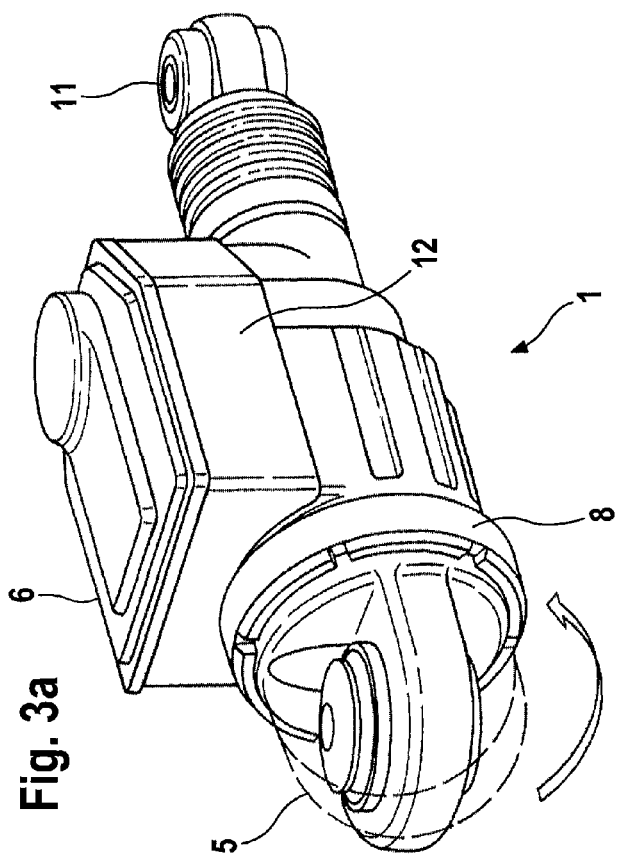
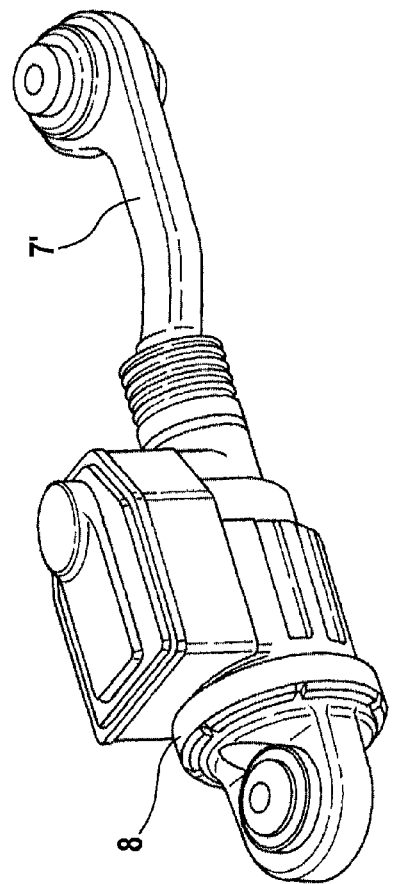
Fig. 3a
Fig. 3b
Fig. 3c

STEERING DEVICE, IN PARTICULAR FOR A REAR WHEEL STEERING SYSTEM

CROSS REFERENCE TO RELATED APPLICATIONS

This application is the U.S. National Phase Application of PCT International Application No. PCT/EP2009/066628, filed Dec. 8, 2009, which claims priority to German Patent Application No. 10 2008 054 430.2, filed Dec. 9, 2008, and German Patent Application No. 10 2009 039 164.9, filed Aug. 27, 2009, the contents of such applications being incorporated by reference herein.

FIELD OF THE INVENTION

The invention relates to a steering device for adjusting a wheel turning angle of a wheel of a motor vehicle, in particular of a rear wheel, comprising at least one wheel guide member via which a wheel carrier of the wheel is connected to a vehicle body, the wheel carrier being swivellable about an axis of rotation disposed substantially parallel to the wheel plane and the wheel guide member being articulated to the wheel carrier at a distance from the axis of rotation and being adjustable in length by means of an electromechanical drive unit, the electromechanical drive unit being connected on the one hand via a push rod to a joint at the wheel carrier end in order to form a swivel bearing by means of which a connection to the wheel carrier is established, and on the other hand to a joint at the vehicle body end in order to form a further swivel bearing by means of which a connection to the vehicle body is established.

BACKGROUND OF THE INVENTION

Such a steering device is known from WO 2006/117343 A1, which is incorporated by reference. The known steering device has an electric motor arranged parallel to the longitudinal axis.

A device for regulating the length of an arm of a suspension for motor vehicles is known from EP 0 340 823 A1, which is incorporated by reference. The rear wheels of a motor vehicle are steered using this measure.

It has been shown that the wheel suspensions for different vehicles are generally different in construction, so that, in the case of the known devices, a modification is required in each case in order to adapt the device to the installation space conditions of a different wheel suspension.

SUMMARY OF THE INVENTION

It is therefore an object of the present invention to provide a steering device of the type mentioned in the introduction which can be integrated especially simply in the conventional wheel suspension of a non-steerable vehicle wheel and which at the same time can be adapted to the confined installation space conditions of differently constructed wheel suspensions.

This object is achieved according to aspects of the invention by a steering device for adjusting a wheel turning angle of a wheel of a motor vehicle comprising: at least one wheel guide member via which a wheel carrier of the wheel is connected to a vehicle body, the wheel carrier being swivellable about an axis of rotation disposed substantially parallel to a wheel plane and the wheel guide member being articulated to the wheel carrier at a distance from the axis of rotation and being adjustable in length by an electromechanical drive unit, the electromechanical drive unit being connected, on one hand, via a push rod to a joint at a wheel carrier end in order to form a swivel bearing by which a connection to the wheel carrier is established, and, on the other hand, to a joint at the vehicle body end in order to form a further swivel bearing by which a connection to a vehicle body is established, wherein at least one joint is configured to be positioned and fixed with respect to the electromechanical drive unit in any desired angular position in relation to the longitudinal axis of the electromechanical drive unit, so that the wheel guide member is adapted to existing installation space conditions.

In this case it is provided that at least one joint can be positioned and fixed with respect to the electromechanical drive unit in any desired angular position in relation to the longitudinal axis of the electromechanical drive unit, so that the wheel guide member can be adapted to the existing installation space conditions.

In an especially advantageous development of the subject matter of the invention, the joint at the vehicle body end can be positioned in any desired angular position with respect to the longitudinal axis of the electromechanical drive unit and can be locked in this position by means of a threaded ring.

A further advantageous development provides that the joint at the wheel carrier end is configured to be exchangeable and that the geometrical position of the joint at the wheel carrier end can be changed by inserting a push rod adapter in order to adapt the wheel guide member to the existing installation space conditions. In this case the electromechanical drive unit includes an electric motor which is arranged coaxially with the longitudinal axis of the electromechanical drive unit.

In an advantageous development it is provided that the electric motor actuates via an interposed epicyclic gear a ball screw which converts the rotary motion of the electric motor into a translational motion of the push rod and effects an adjustment of the length of the wheel guide member.

The push rod adapter can be inserted in the screw spindle of the ball screw by means of a thread.

An especially advantageous development of the subject matter of the invention provides that neither the epicyclic gear nor the ball screw are configured to be self-locking, there being provided a blocking device which brings a magnet plunger actuated by a locking magnet into engagement with a locking ring which is connected to the ball screw, so that adjustment of the length of the wheel guide member is prevented.

A further configuration provides that a control unit is arranged adjacent to the electric motor in the housing of the electromechanical drive unit.

In order to determine the rotor position, the electric motor has at least one sensor which is in the form of a position sensor mounted axially on the electric motor, or of a ring sensor connected to the rotor of the electric motor.

The wheel guide member is a track rod and/or track control arm of an independent wheel suspension.

A further configuration of the subject matter of the invention provides that the electromechanical drive unit, the joint at the wheel carrier end and the joint at the vehicle body end are implemented as assemblies which can be handled independently.

BRIEF DESCRIPTION OF THE DRAWINGS

The invention is best understood from the following detailed description when read in connection with the accompanying drawings. Included in the drawings is the following figures:

FIGS. 3a,b,c are three-dimensional representations of the wheel guide member according to aspects of the invention with rotatable joint at the vehicle body end and different push rod adapters;

DETAILED DESCRIPTION OF THE PREFERRED EMBODIMENTS

Figure 1:
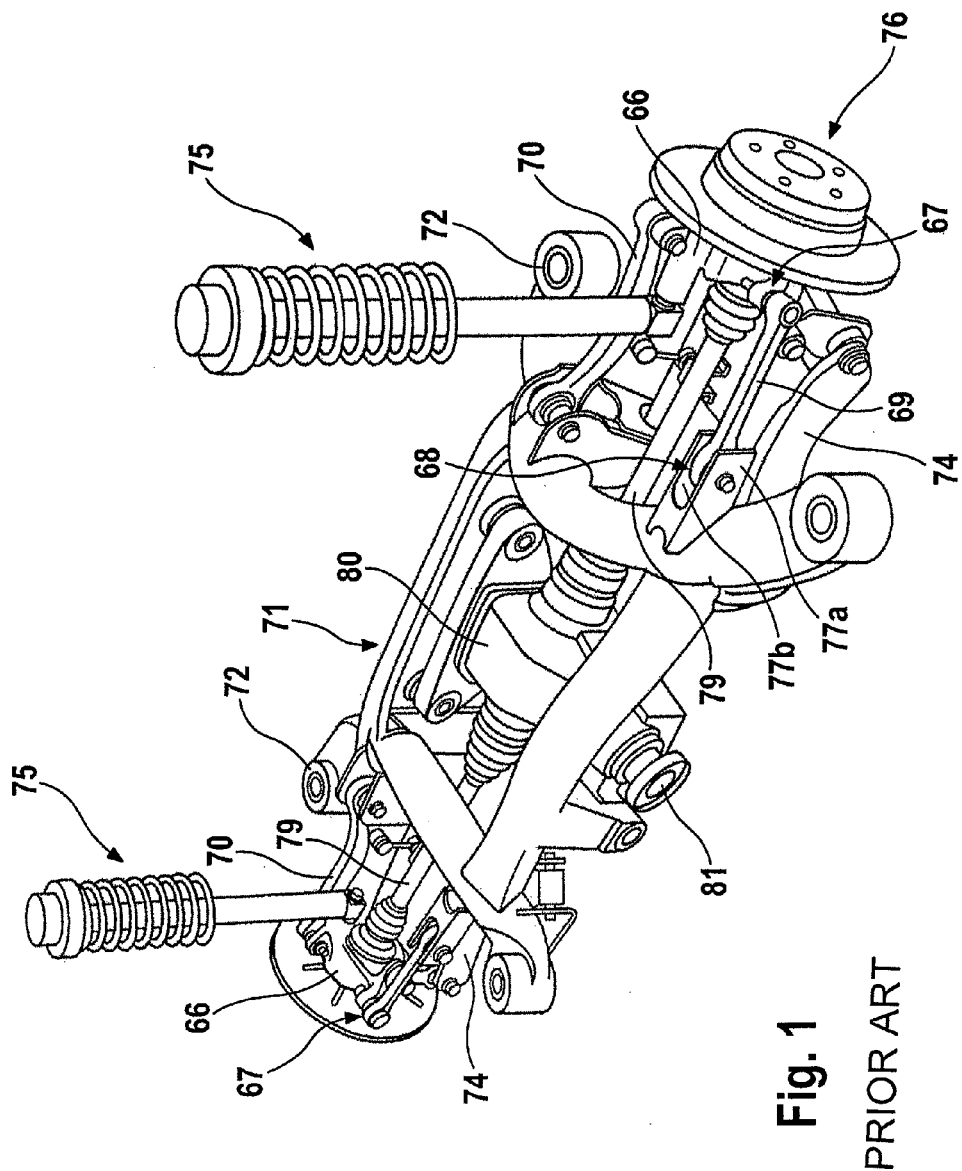
FIG. 1 shows an integral rear axle carrier according to the prior art.

FIG. 1 shows an integral rear axle carrier for a driven rear axle of a motor vehicle, as known per se from the prior art. It comprises a subframe 71 which is connected to a body (not shown in FIG. 1) of the vehicle at attachment points 72. Wheel carriers 66 are articulated to the subframe 71 via wheel control arms 74. Furthermore, a respective suspension strut 75 for bearing against the body is mounted firmly to each of the wheel carriers 66. In addition, wheel mountings 76 attached to the wheel carriers are shown in FIG. 1. The rear wheels of the vehicle attachable to the wheel carriers 66 or to the wheel mountings 76 are each driven by a respective wheel drive shaft 79. In this case the wheel drive shafts 79 are connected to one another via a differential gear 80 which has a flange 81 oriented forwardly in the longitudinal direction of the vehicle for attachment of a shaft driven by the vehicle engine.

Also located in each case between the subframe 71 and the wheel carriers 66 is a respective track rod 69 of fixed length which is connected to the subframe 71 at one end and to the wheel carrier 66 at the other end by respective swivel bearings 67, 68.

In the steering device described below, it is provided that a wheel guide member of fixed length is replaced on each side of the integral rear axle carrier by a wheel guide member of adjustable length. In this case the track rods 69 are each replaced by a respective wheel guide member 1, represented in FIG. 2, the length of which is variable, as is explained in more detail below. Alternatively, a track control arm 70 of an independent wheel suspension may also be replaced by the wheel guide member 1 of adjustable length illustrated in FIG. 2.

Figure 2:
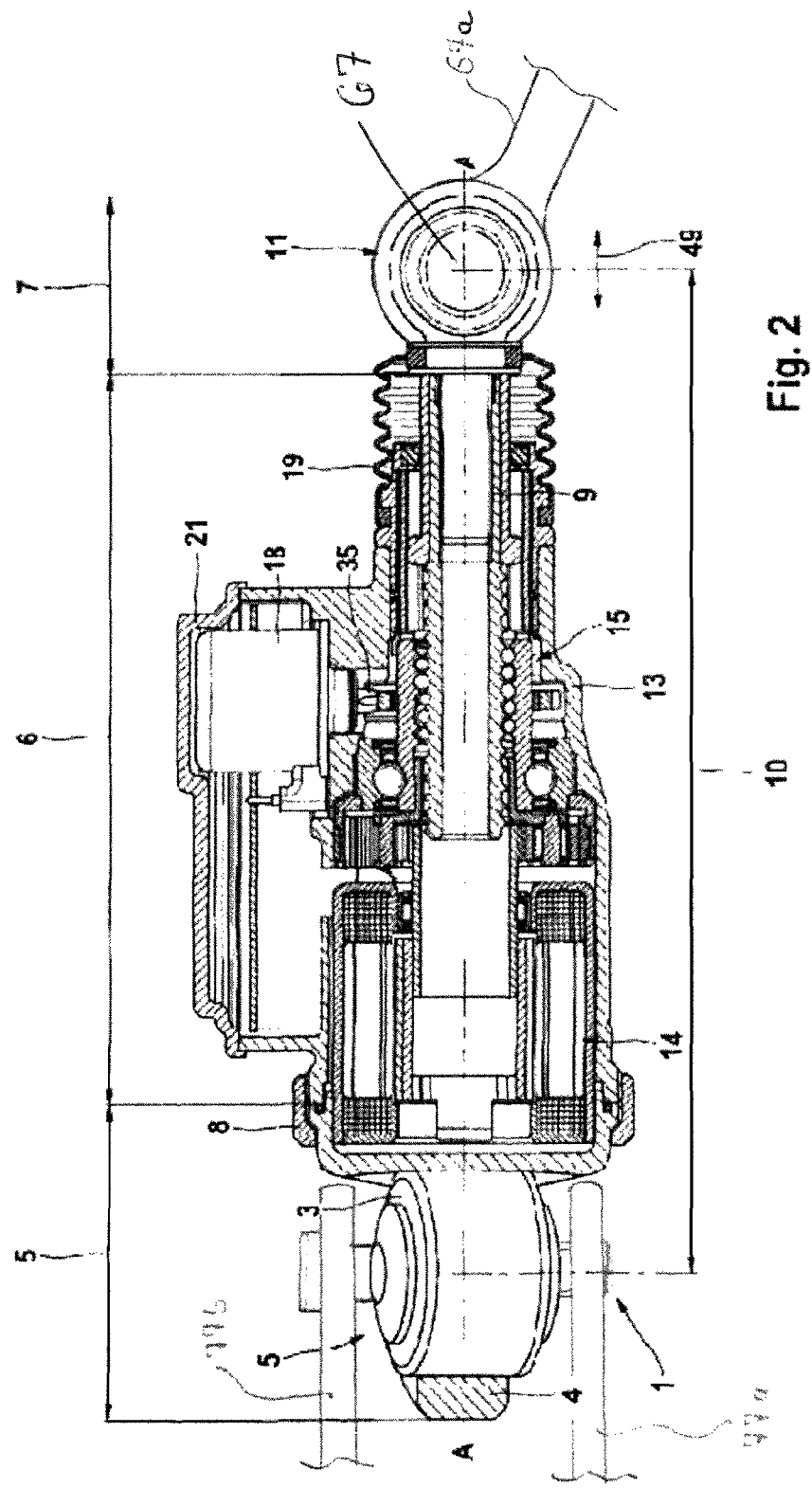
FIG. 2 is a sectional representation of the wheel guide member according to aspects of the invention.

As shown in FIG. 2, for attachment to the subframe 71 the wheel guide member 1 has a joint 5 at its vehicle body end which, together with the bearing side pieces 77a, 77b (FIG. 1) of the subframe 71, forms the swivel bearing 68. The wheel guide member 1 may be articulated to the connecting rod 67a of the wheel carrier 66 via the joint 11 at the wheel carrier end, which forms the swivel bearing 67.

The wheel guide member 1 contains an electromechanical drive unit with which a push rod 9 is moved via a transmission in order to swivel the wheel carrier 66 about an axis of rotation disposed substantially parallel to the wheel plane. In this case the joint 11 at the wheel carrier end, which engages on the swivel bearing 67, is arranged on the push rod 9.

Through variation of the length of the wheel guide member 1 the turning angle of the rear wheels mounted on the wheel carriers 66 is changed. In particular, in the embodiment illustrated, a change of the wheel turning angle in the direction of toe-in is effected by a lengthening of the wheel guide member and a change in the direction of toe-out is effected by a shortening thereof.

As a rule, modification of the other wheel control arms 74 is not required, since wheel suspensions usually permit swiveling of the wheels in the direction of toe-in and toe-out. In particular, wheel turning angles lying within the range of wheel turning angles which result from elastokinematic steering movement and are already large enough effectively to influence vehicle dynamics can be realised without further modifications. Equally, however, it may also be provided that the wheel suspension is modified so that larger steering angles are possible.

Owing to the confined installation conditions of the vehicle-specific integral rear axle carriers, it is very difficult to provide a standardised construction of the wheel guide member 1 for different vehicles. It is conceivable that a specifically adapted construction for each vehicle producer might be provided. In the case of the wheel guide member described, by contrast, it is provided that it can be integrated in the conventional wheel suspension of a non-steerable vehicle wheel while being adaptable to the confined installation space conditions of differently constructed wheel suspensions. At the same time, a compact construction is implemented, as is explained in more detail below.

As shown in FIG. 2, the wheel guide member 1 consists essentially of three main assemblies: the joint 5 at the vehicle body end comprising a bearing housing 4 with integrated vehicle-specific rubber bearing 3, the electromechanical drive unit 6, and the vehicle-specific track rod adapter 7, which is formed by the push rod 9 and the joint 11 at the wheel carrier end.

The joint 5 at the vehicle body end is connected to the electromechanical drive unit 6 by means of a threaded ring 8. In this case the joint 5 at the vehicle body end is positioned during final assembly in an angular position with respect to the longitudinal axis A of the electromechanical drive unit 6 which is adapted to the installation space conditions, and is locked in this position by means of the threaded ring 8. In general, the joint 5 at the vehicle body end can be positioned in any desired angular position with respect to the electromechanical drive unit 6 and secured in this position with the threaded ring 8. The wheel guide member 1 is thereby adaptable to the existing installation space conditions. Furthermore, the use of the threaded ring 8 results in a very compact construction of the two housing interfaces, and the two housing components, bearing housing 4 and module housing 13, are stressed symmetrically under load, resulting in a reduction of material and installation space. The free positioning of the joint 5 at the vehicle body end about the longitudinal axis A is also represented schematically in FIG. 3a.

As is shown in FIGS. 3b and c in conjunction with FIG. 2, the joint 11 at the wheel carrier end is configured to be exchangeable. Through the use of a push rod adapter 7, 7' the geometrical position of the joint 11 at the wheel carrier end is variable and the wheel guide member 1 is adaptable to the existing installation space conditions. As a result of a standardised interface between the push rod 9 and the electromechanical drive unit 6, the use of a push rod adapter 7, 7' is made possible and vehicle-specific track rod lengths 10 can be implemented in a simple manner. The most diverse vehicle applications are implemented using the same electromechanical drive unit 6 and using a suitable joint 5 at the vehicle body end and a suitable track rod adapter 7, 7'.

Because the electromechanical drive unit 6 is freely rotatable with respect to the bearing 5 at the vehicle body end, the position of the asymmetrical housing part, denoted by reference 12, can be better adapted to the locally different conditions within the integral rear axle carrier. As shown in FIG. 2, the asymmetrical housing part 12 accommodates a control unit 20 and a locking magnet 18, the function of which will be explained later.

As is further apparent from FIG. 2, the electromechanical drive unit 6 is enclosed by a module housing 13 and consists essentially of an electric motor 14, a transmission 15 and a blocking device 18, 24, 35 for preventing adjustment of the length of the wheel guide member 1. The electric motor 14 is arranged coaxially with the longitudinal axis A of the electromechanical drive unit.

Figure 4A:
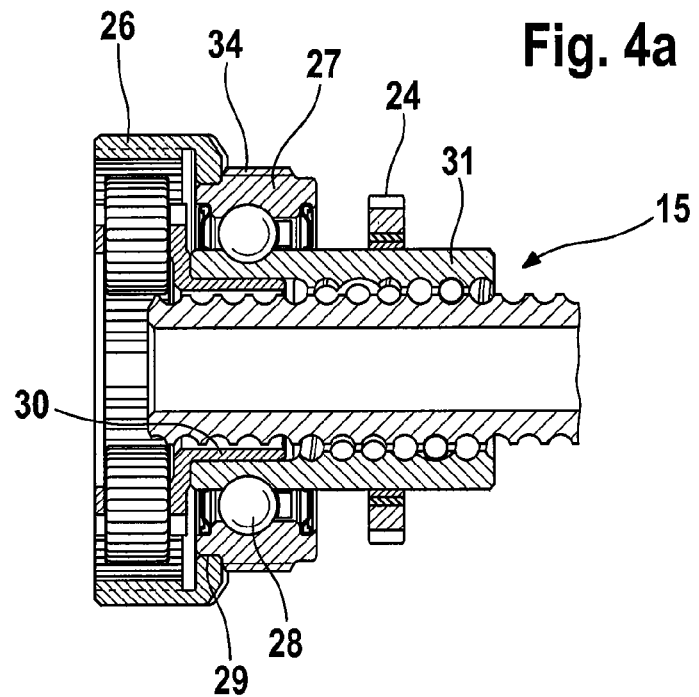
FIGS. 4a,b show a transmission for converting a rotary motion into a translational motion, which transmission is used in the wheel guide member according to aspects of the invention.
Figure 4B:
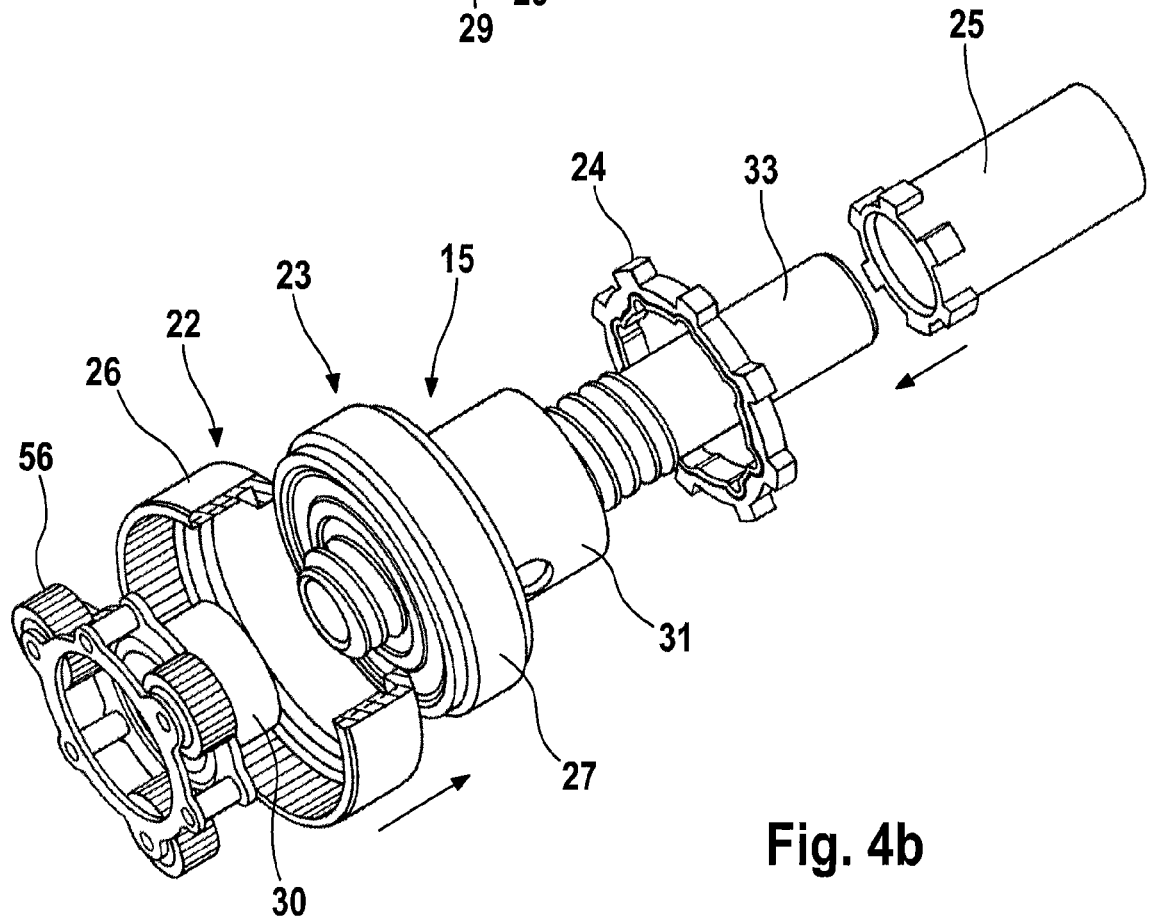

The transmission 15 for converting the rotary motion of the electric motor 14 into a translational motion of the push rod 9 is represented in FIGS. 4a and b and forms a module which can be preassembled. The transmission 15 is formed by an epicyclic gear 22, a ball screw 23, a locking wheel 24 and an anti-rotation sleeve 25.

In this case the ring gear 26 of the epicyclic gear 22 is connected positively and non-positively by a press fit to an outer ring 27 of the axial bearing 28 of the ball screw 23. The location of the press fit connection is denoted by reference 29. Alternatively to the press fit connection 29 illustrated, the ring gear 26 and the outer ring 27 may be formed integrally. In addition, the planet gear carrier 30 of the epicyclic gear 22 may be connected positively and non-positively by a press fit to the threaded nut 31 of the ball screw 23. Alternatively, the planet gear carrier 30 and the threaded nut 31 may also be formed integrally here too. In addition, the locking wheel 24 with the threaded nut 31, and the anti-rotation sleeve 25 with the spindle 33 of the ball screw 23, are connected to one another positively and non-positively. In this case, knurlings applied partially to the harder connection partners are suitable as positive and non-positive connections.

A screw insertion thread 34 by means of which the transmission 15 can be screwed into the module housing 13 of the electromechanical drive unit 6 is formed on an outer ring 27 of the ball screw 23.

Figure 5A:
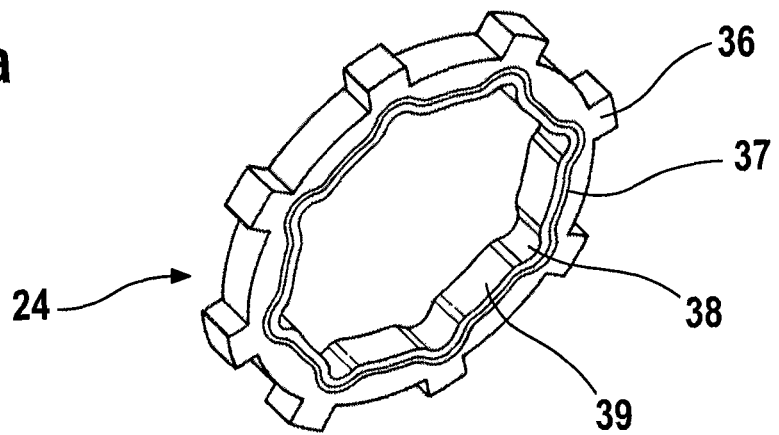
FIGS. 5a,b show a blocking device which prevents adjustment of the length of the inventive wheel guide member when required.
Figure 5B:
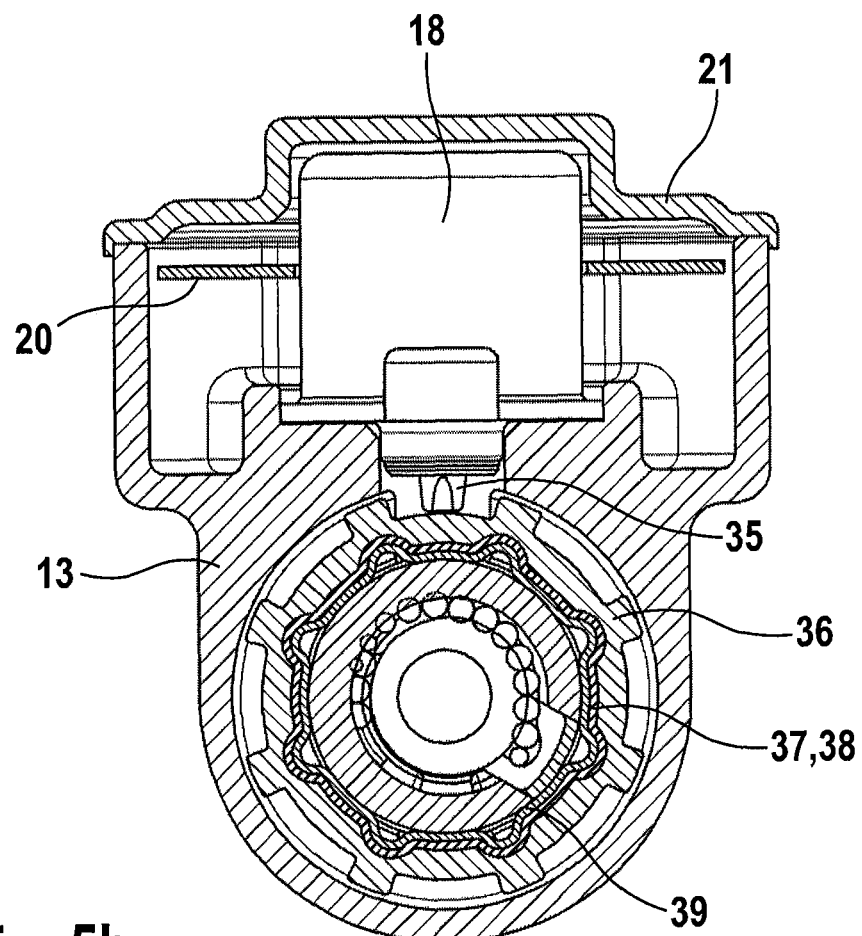
Figure 6A:
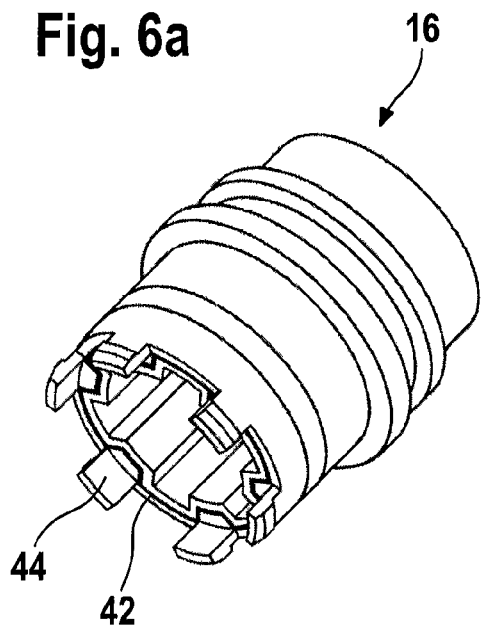
FIGS. 6a to d show an anti-rotation device for mounting the transmission according to FIG. 4 in the housing of the wheel guide member.
Figure 6B:
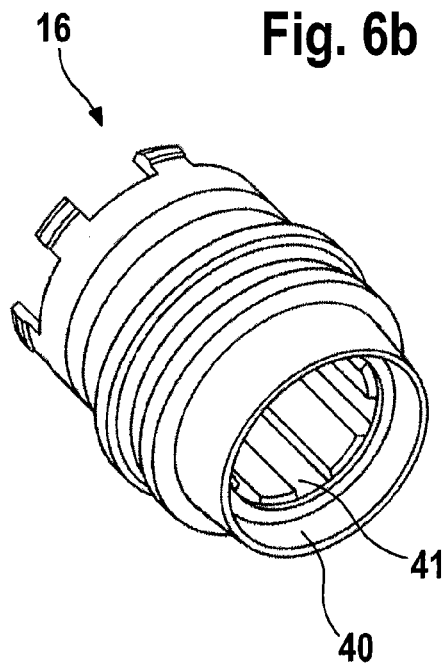
Figure 6C:
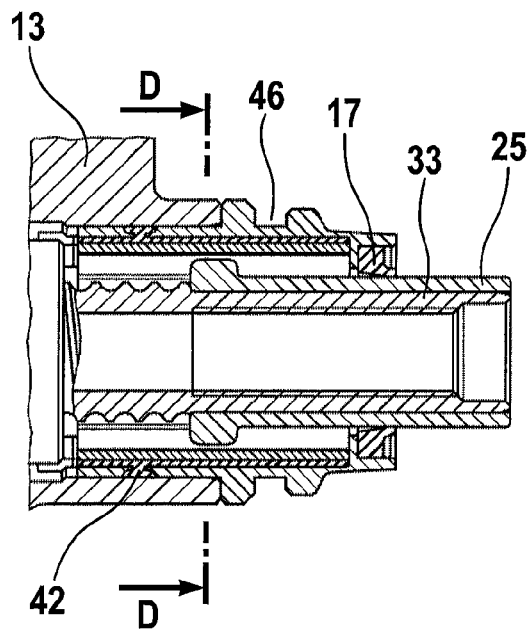
Figure 6D:
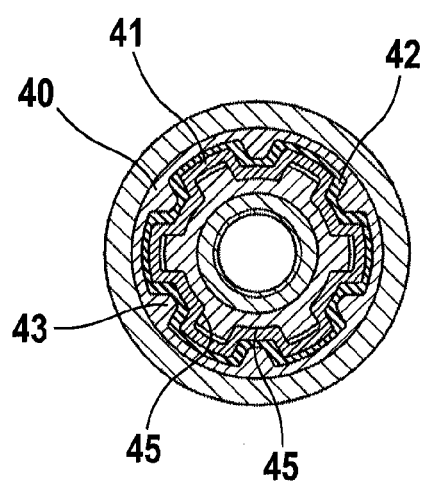

The operation of the blocking device 18, 24, 35 will be explained in more detail with reference to FIGS. 5a and b. In the return movement plane of the wheel guide member 1 the locking magnet 18 is switched to the unenergised state. As a result, the spring-preloaded magnet plunger 35 latches mechanically in a latching ring 36 of the locking ring 24 and locks the positioning movement of the wheel guide member 1. Because the mechanical locking of the wheel guide member 1 can also be initiated during a steering process of the rear wheels, the impulse acting on the magnet plunger 35 is damped by means of an outer latching ring 36 decoupled by an elastomer 37. Shearing of the elastomer 37 under load is prevented by the shaping 38 of the inner ring 39 and of the latching ring 36.

An anti-rotation device 16 of the push rod adapter 7, 7' will be explained with reference to FIGS. 6a to d: The drive torque of the electric motor 14 is resisted against the module housing 13 by means of the anti-rotation device 16, whereby the linear motion 49 of the ball screw 33, and therefore of the push rod 9, is produced. The anti-rotation device 16 is preferably a component made of plastics material and consisting of a plurality of constituents. In this case the outer ring 40 is connected elastically and form-fittingly to the inner ring 41, via a moulded-in elastomer insert 42, by the profiling 43 of the two components. The elastomer insert 42 on the outer ring 40 preferably at the same time assumes a sealing function 43 after the anti-rotation device 16 has been installed axially in the module housing 13. The integrally moulded locking lugs 44 on the outer ring 40 serve to lock the anti-rotation device 16 axially in the module housing 13.

The inner ring 41 performs within the anti-rotation device 16 the function of a sliding bearing 45 for the spindle 33, and at the same time forms a radial bearing by means of the pressed-on splined profile of the anti-rotation sleeve 25. As a result of the elastomer bedding of the inner ring 41 in the outer ring 40, the flank loading of the torque resistance moments of the inner ring 41 is compensated harmoniously. Noise isolation is thereby achieved.

The receptacle of the wiper ring 17 and the receiving groove 46 of the bellows 19 are preferably integrated in the outer ring 40 of the anti-rotation device 16.

Figure 7:
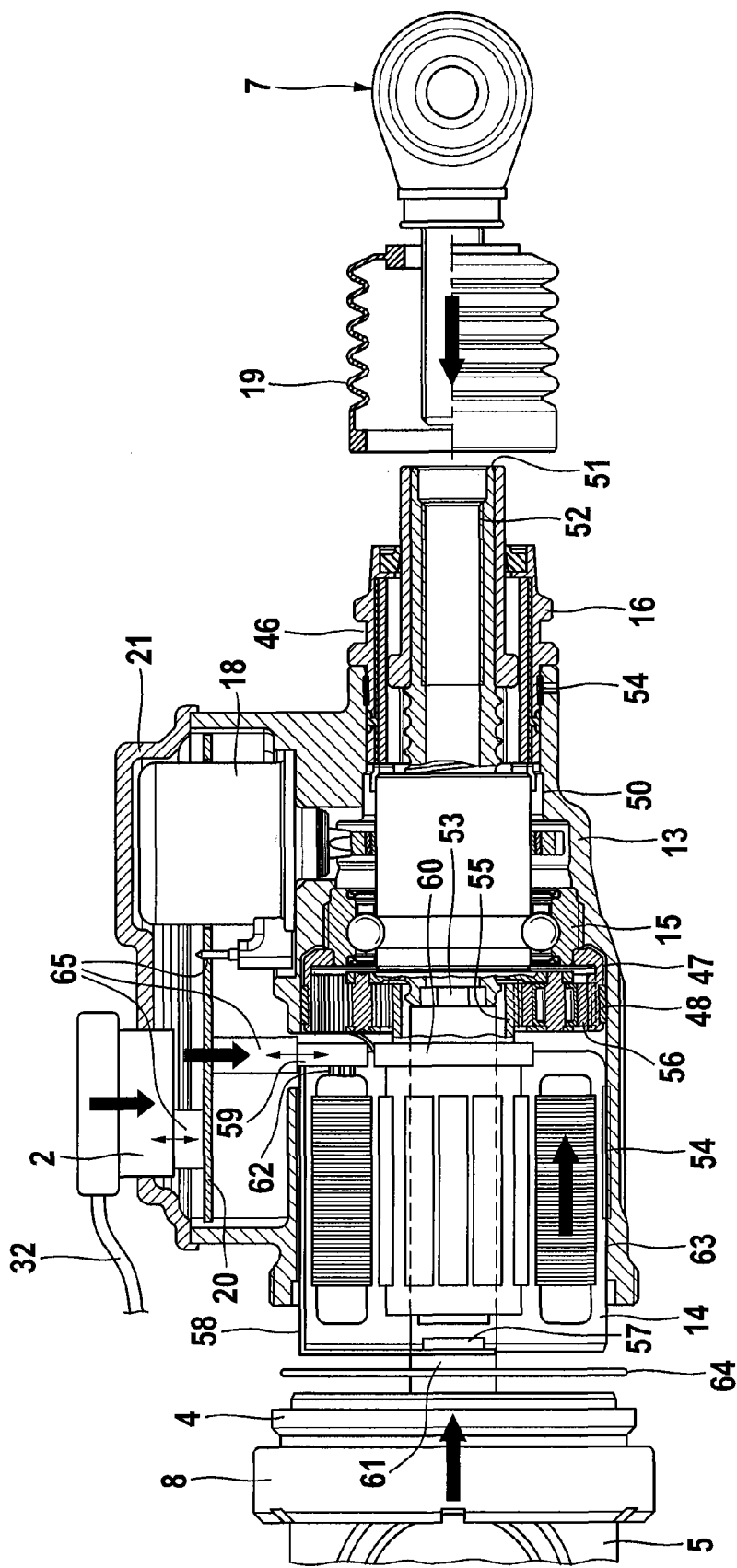
FIG. 7 is a schematic sectional representation of the wheel guide member according to aspects of the invention.

The assembly process of the electromechanical drive unit 6 is described below with reference to FIG. 7.

The locking magnet 18 is inserted in the module housing 13 and caulked positively and non-positively therein at the collar of the locking magnet 18.

The transmission 15 for converting the rotary motion of the electric motor 14 into a translational motion of the push rod 9 is screwed into the module housing 13. In this case the ring gear 26 of the epicyclic gear 22 is decoupled acoustically and mechanically from the module housing 13 by a circumferential gap 47. The running noises of the planet gears 56 are damped by the acoustic decoupling. For noise optimisation, a damping ring 48 may optionally be integrated in the ring gear 26.

The anti-rotation device 16 is then installed axially in the module housing 13. As this is done the anti-rotation device 16 is inserted by rotation into the splined profile of the anti-rotation sleeve 25 and locked axially in abutment with the recess 50 by means of the locking lugs 44. The anti-rotation device 16 is fixed rotationally with respect to the module housing 13 by means of an adhesive bonding process at the location denoted by reference 54, after the appropriate track rod adapter 7, 7' has been installed.

The bellows 19 is fitted into the receiving groove 46 of the anti-rotation device 16. The track rod adapter 7, 7' is now screwed into the spindle 33 provided with an internal thread 52, against the stop 51. The torque acting on the spindle 33 as this happens is resisted by a hexagon 53 applied opposite. The angular position of the track rod adapter 7, 7' with respect to the electromechanical drive unit 6 is now aligned by means of the anti-rotation device 16, which is still rotatable in the module housing 13. Then the rotary motion of the anti-rotation device 16 is fixed positively and non-positively with respect to the module housing 13 by means of an adhesive injection at location 54.

The electric motor 14 is inserted axially into the module housing 13, the sun gear 55 being a component of the electric motor 14 and meshing with the planet gears 56 of the epicyclic gear 22 during the assembly process. The electric motor 14 has mounted axially thereon a position sensor 57 which is electrically connected via a conductive track 58 integrated in the plastics moulding to a plug contact 59 mounted axially on the front face. Alternatively, a ring sensor 60 may be mounted on the front face for commutating the electric motor 14. The use of a ring sensor 60 makes it possible to integrate a compensating spring 61, which compensates a pressure force acting on the track rod when the vehicle is at standstill and partially loaded. By this measure the electric motor 14 is unloaded when the vehicle is travelling straight, improving the energy balance. In addition, the plug contact 59 just mentioned contains the electrical interface with the electric motor phases 62. The diameter of the plug contact 59 does not extend beyond the diameter of the electric motor, making possible a very compact axial installation of the electric motor 14 in the module housing 13. The fixing of the electric motor 14 in the module housing 13 is effected positively by means of a knurling 63 applied partially to the electric motor housing. The joint 5 at the vehicle body end is now installed using the threaded ring 8. The two housing parts 4, 13 are sealed by means of an O-ring 64. The control unit 20 is then installed. In the case of axial installation, the electric motor 14 and the locking magnet 18 are contacted with the control unit 20 via electrical interfaces 65 which form part of the circuit board of the control unit 20. The assembly of the wheel guide member 1 is completed by the installation of the cover 21. The cover 21 contains an external electrical interface 2 with an outgoing cable 32 leading to a brake control unit or to the vehicle bus CAN. The external electrical interface 2 is configurable individually for different vehicle models. During assembly, this external interface 2 contacts the interface 65 of the control unit 20. Alternatively, the control unit 20 may be integrated in the cover 21, whereby an electrical interface 65 between the circuit board of the control unit 20 and the external electrical interface 2 may be omitted. If the cover 21 is made of aluminium with cooling ribs (not shown), the cover 21 may be utilised as a cooling body.

The invention claimed is:

1. A steering device for adjusting a wheel turning angle of a wheel of a motor vehicle comprising:
at least one wheel guide member via which a wheel carrier of the wheel is connected to a vehicle body, the wheel carrier being swivellable about an axis of rotation disposed substantially parallel to a wheel plane and the wheel guide member being articulated to the wheel carrier at a distance from the axis of rotation and being adjustable in length by an electromechanical drive unit,
the electromechanical drive unit being connected, on one hand, via a push rod to a joint at a wheel carrier end in order to form a swivel bearing by which a connection to the wheel carrier is established, and, on the other hand, to a joint at the vehicle body end in order to form a further swivel bearing by which a connection to a vehicle body is established,
wherein at least one joint is configured to be positioned and fixed with respect to the electromechanical drive unit in any desired angular position in relation to the longitudinal axis of the electromechanical drive unit, so that the wheel guide member is adapted to existing installation space conditions.

2. The steering device according to claim 1, wherein the joint at the vehicle body end is configured to be positioned in any desired angular position with respect to the longitudinal axis of the electromechanical drive unit and is configured to be fixed in position by a threaded ring.

3. The steering device according to claim 1, wherein a position of the joint at the wheel carrier end is configured to be varied by inserting a push rod adapter.

4. The steering device according to claim 1, wherein the electromechanical drive unit includes an electric motor which is arranged coaxially with the longitudinal axis of the electromechanical drive unit.

5. The steering device according to claim 4, wherein the electric motor actuates, via an interposed epicyclic gear, a ball screw which converts the rotary motion of the electric motor into a translational motion of a push rod and causes an adjustment of the length of the wheel guide member.

6. The steering device according to claim 5, wherein the push rod adapter is configured to be inserted by a thread into a screw spindle of the ball screw.

7. The steering device according to claim 5, wherein neither the epicyclic gear nor the ball screw are configured to be self-locking, a blocking device being provided which brings a magnet plunger actuated by a locking magnet into engagement with a locking ring which is connected to the ball screw, so that adjustment of the length of the wheel guide member is prevented.

8. The steering device according to claim 4, wherein a control unit is arranged adjacent to the electric motor in a housing of the electromechanical drive unit.

9. The steering device according to claim 4, wherein the electric motor has at least one sensor for determining a position of a rotor of the electric motor.

10. The steering device according to claim 9, wherein the sensor is either a position sensor that is mounted axially on the electric motor or the sensor is a ring sensor that is connected to the rotor of the electric motor.

11. The steering device according to claim 1, wherein the wheel guide member is a track rod, a track control arm, or both a track rod and a track control arm of an independent wheel suspension.

12. The steering device according to claim 1, wherein the electromechanical drive unit, the joint at the wheel carrier end and the joint at the vehicle body end are independent.

13. The steering device according to claim 1, wherein the wheel is a rear wheel.

14. The steering device according to claim 1, wherein the at least one joint is rotatable with respect to the electromechanical drive unit.

* * * * *